(12) United States Patent
Takeda

(10) Patent No.: US 6,898,163 B2
(45) Date of Patent: May 24, 2005

(54) OPTICAL DISC APPARATUS

(75) Inventor: Naoto Takeda, Tokyo (JP)

(73) Assignee: TEAC Corporation, Musashino (JP)

(*) Notice: Subject to any disclaimer, the term of this patent is extended or adjusted under 35 U.S.C. 154(b) by 433 days.

(21) Appl. No.: 10/231,303

(22) Filed: Aug. 28, 2002

(65) Prior Publication Data

US 2003/0043713 A1 Mar. 6, 2003

(30) Foreign Application Priority Data

Aug. 28, 2001 (JP) .................................. 2001-258545

(51) Int. Cl.$^7$ .............................................. G11B 7/00
(52) U.S. Cl. ................................. 369/47.53; 369/53.19
(58) Field of Search ........................... 369/44.32, 47.53, 369/53.18, 53.19, 53.35, 59.11, 116

(56) References Cited

U.S. PATENT DOCUMENTS

| | | | | |
|---|---|---|---|---|
| 5,475,666 | A | * 12/1995 | Ito et al. ..................... | 369/116 |
| 6,404,713 | B1 | * 6/2002 | Ueki ........................ | 369/59.11 |
| 6,414,922 | B1 | * 7/2002 | Akiyama et al. ......... | 369/47.52 |
| 6,765,850 | B2 | * 7/2004 | Shiozawa et al. ........ | 369/47.53 |
| 6,813,107 | B1 | * 11/2004 | Lee .......................... | 369/53.1 |

FOREIGN PATENT DOCUMENTS

| JP | 6036285 | 2/1994 |
|---|---|---|
| JP | 2000-137918 | 5/2000 |
| JP | 2001052351 | 2/2001 |

* cited by examiner

Primary Examiner—Thang V. Tran
Assistant Examiner—Bach Q. Vuong
(74) Attorney, Agent, or Firm—Christensen O'Connor Johnson Kindness PLLC

(57) ABSTRACT

An optical disc apparatus for recording test data on a predetermined area of an optical disc under varied recording powers to determine an optimum recording power based on the quality of a signal obtained by reproducing the recorded test data. The test data is recorded under adverse recording conditions so as to evaluate the amount of change in quality of the reproduction signal. In order to create adverse recording conditions, the optical disc is tilted or the laser is defocused. A recording power for which the change in signal quality due to the deteriorated recording conditions is sufficiently small is determined as an optimum recording power capable of providing adequate recording margin.

19 Claims, 11 Drawing Sheets

OPTICAL DISC APPARATUS

BACKGROUND OF THE INVENTION

1. Field of the Invention

The present invention relates to power optimization of an optical disc apparatus and more particularly to power optimization when data is recorded on a recordable optical disc.

2. Description of the Related Art

OPC (Optimum Power Control) is a publicly known technology for optimizing recording power when data is recorded on an optical disc. With OPC, test data is recorded on a predetermined area PCA of an optical disc at various power levels. Each set of test data recorded at a different recording power is then reproduced so as to determine the optimum power by selecting the recording power at which jitter or error rate becomes minimum, or the power level at which jitter or error rate becomes less than or equal to a threshold value.

An alternate method for determining the optimum recording power without performing test recording has also been known. According to this alternate method, data on an optimum recording power prestored in a control data zone of an optical disc is initially retrieved and then recording under the retrieved optimum recording power is performed on DVD-RAM or the like.

A method using data concerning the optimum recording power previously recorded on the control data zone of the optical disc, however, is problematic in that data recording under the optimum recording power is not always achieved optimally when a combination of an optical disc and an optical disc driver (optical disc apparatus) is changed. That is, because optical properties such as optical pickup and the like will vary among different optical disc apparatuses, an optimum recording power obtained by one optical disc apparatus under a certain standard is not always optimum for another optical disc apparatus. This method has another problem in that it is incapable of supporting variations in optimum recording power resulting from changes in recording characteristics due to degradation of the optical disc by aging.

Although these problems can be avoided by using OPC to determine the optimum recording power, with such a composite method there is a problem that it cannot be known whether or not the determined recording power is capable of providing sufficient margin of recording conditions. This uncertainty of recording margin raises the possibility of recording instability. As a solution to secure recording margin when optimum recording power is determined by OPC, it is possible to select a recording power higher than the needed optimum recording power. However, excessively increasing the recording power may decrease the number of recordings that can be made on a disk, leading to a durability problem.

SUMMARY OF THE INVENTION

It is therefore an object of the present invention to provide an optical disc apparatus wherein an adequate recording margin is secured.

An optical disc apparatus according to the present invention comprises recording means for recording test data on a predetermined area of an optical disc by irradiating laser light while changing recording power in a plurality of levels, reproducing means for reproducing said test data, and setting means for determining an optical recording power by evaluating signal quality of a reproduction signal. In the optical disc apparatus, the recording means deteriorates recording conditions (intentionally creates adverse or less than ideal recording conditions) and then records said test data, the reproducing means recovers said recording conditions from the deteriorated state and then reproduces the test data, and the setting means determines an optimum recording power based on each amount of change in signal quality from a recording power to another recording power. When the test data is recorded under adverse (deteriorated) recording conditions, reproduction signal quality of the test data is substantially degraded when a recording power with small recording margin is employed, but only slightly degraded when a recording power capable of securing adequate recording margin is employed. By evaluating the amount of change in reproduction signal quality, it becomes possible to determine the optimum recording power with which adequate recording margin is secured.

According to an embodiment of the present invention, recording conditions are deteriorated through methods for tilting the optical disc and/or defocusing laser light irradiated onto the optical disc. The test data is recorded in a tilted state or a defocused state and reproduction signal quality, for example, jitter or error rate of the recorded test data is evaluated. In an example described in the embodiment, the amount of each change in jitter or error rate is compared with a reference value to set the optimum recording power at a recording power under which the amount of change in jitter or error rate close to the reference value is obtained.

The present invention may be applied to a CD-R drive, a CD-RW drive, a DVD-R drive, a DVD-RAM drive, and similar devices.

Although the present invention will be clearly understood by reference to the following embodiment, the scope of this invention is not limited to the embodiment.

DESCRIPTION OF THE PREFERRED EMBODIMENT

A preferred embodiment of the present invention will be described below with reference to the drawings, beginning with a description of a basic principle of this embodiment.

According to the present embodiment, when test data is recorded while varying recording powers so as to perform OPC, test recording is executed not under normal, presumably ideal recording conditions, but under intentionally deteriorated conditions. During recording, reproduction signal quality significantly declines when a recording power providing a small recording margin is used. On the contrary, the reproduction signal quality declines only slightly when a recording power providing a large recording margin is used. Therefore, by evaluating the reproduction signal quality of test data recorded under intentionally set imperfect recording conditions, it becomes possible to estimate recording margin of the recording power under which the test data is recorded. A recording power with adequate recording margin is determined based on the obtained estimate.

To create deficient recording conditions, for example, a slope (tilt) of an optical disc against optical pickup or focus offset of the optical pickup may be shifted from the best conditions thereof.

Figure 1:
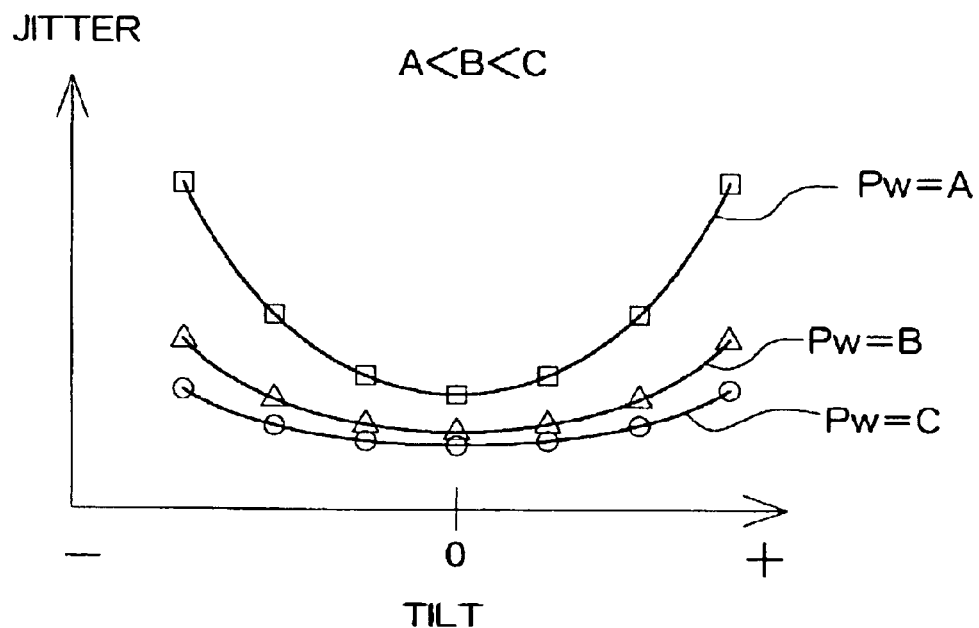
FIG. 1 is a graph showing a relationship between tilt and jitters.

FIG. 1 shows changes in reproduction signal quality (jitter) of test data when the amount of tilt is changed from 0 (not tilted state), in other words, the changes in jitter between when the test data is recorded on condition that tilt is changed from 0 to another value and when the test data is reproduced on condition that tilt is returned back to 0 after recording. In FIG. 1, plotting the amounts of tilt in abscissa and the amounts of jitter in a reproduction signal in ordinate, three recording powers A, B and C (A<B<C) are shown. Each difference between two neighboring recording powers among A, B, and C is equal and represented by a constant value k, that is, B−A=C−B=k. For recording power A, the amount of jitter in a reproduction signal increases, i.e. reproduction signal quality decreases as the increase in tilt angle in either positive or negative direction causing deterioration in recording conditions. The amount of jitter associated with recording power B, which is larger than the recording power A, also increases as tilt angle increases, but to a lesser degree. That is, the decline in the reproduction signal quality under the recording power B is smaller than the decline in the reproduction signal quality under the recording power A. Further, for recording power C, the amount of jitter changes only slightly, i.e. the reproduction signal quality declines only slightly as tilt angle increases in either the positive or negative direction. Because the recording power A provides small recording margin and the recording power B or C provides a larger recording margin, the recording powers B and C are preferable in view of recording margin. When attention is focused on a certain tilt angle, it can be shown that the amount of change in jitter between the recording powers A and B is large and the amount of change in jitter between the recording powers B and C is small, or almost equal, even though the recording powers A, B and C are established at regular intervals.

Figure 2:
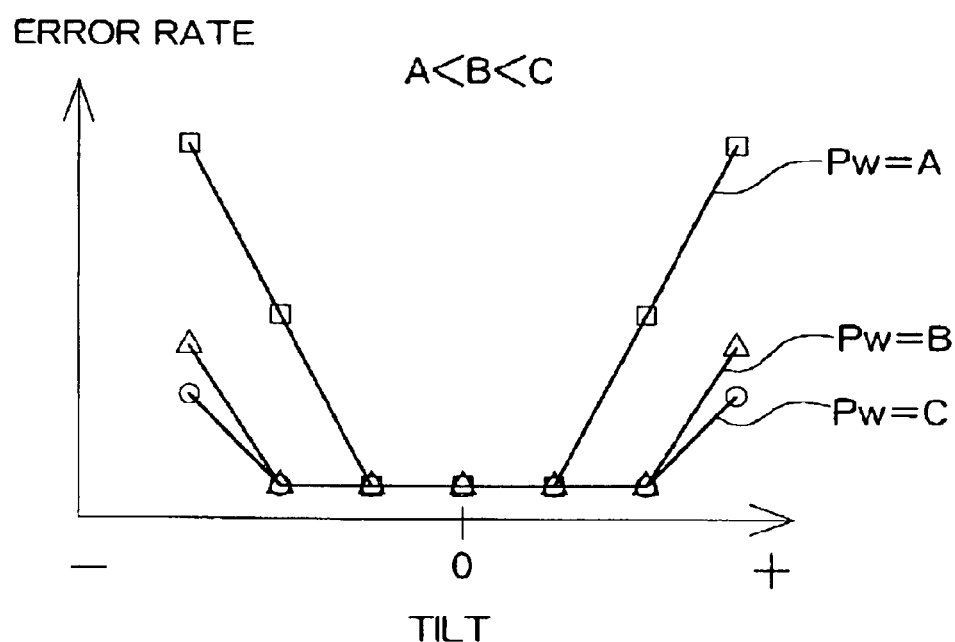
FIG. 2 is a graph showing a relationship between tilt and error rates.

Referring to FIG. 2, a relationship between tilt angles and error rates of reproduction signal quality is shown.

More specifically, changes in the error rate occur between when test data is recorded on condition that a tilt angle is changed from 0 to another angle and when the test data is reproduced on condition that the tilt angle is returned back to 0 are shown in the figure. In FIG. 2, tilt angles are plotted along the abscissa as with FIG. 1 and error rates of the generative signal quality are plotted along the ordinate. Also as with FIG. 1, three recording powers A, B and C (A<B<C) are represented. As to the recording power A, an error rate sharply increases, i.e. the reproduction signal quality decreases as the increase in tilt angle in either positive or negative direction. With recording power B or C, the error rate also increases with an increase of tilt angle, yet not to the same extent as with recording power A. This demonstrates that decline in the reproduction signal quality under the recording power B or C is small. Accordingly, it can be seen that the recording powers B and C are superior to the recording power A in terms of both error rate and recording margin. Further, from a small variation in the amounts of change between the recording powers B and C, it also can be understood that the recording power B is capable of providing almost the same amount of recording margin as the recording power C.

Figure 3:
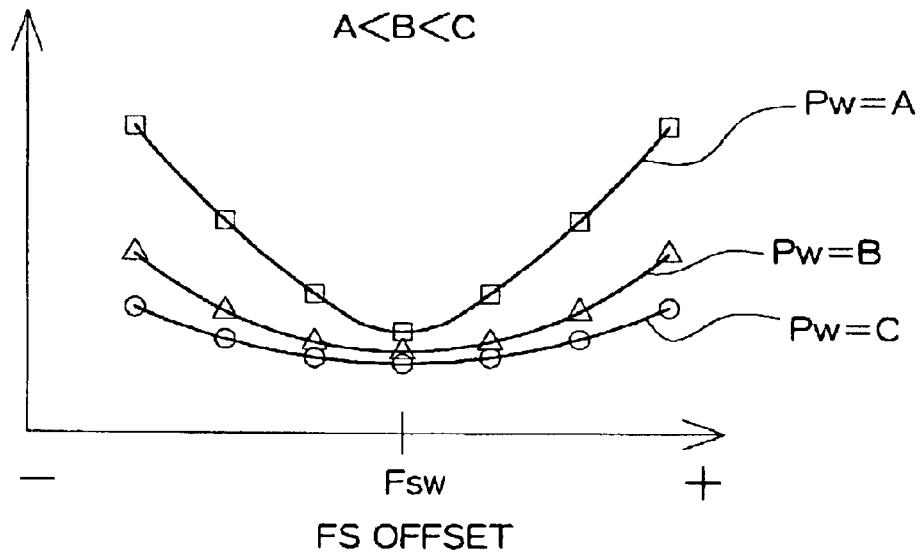
FIG. 3 is a graph showing a relationship between focus offset and jitters.
Figure 4:
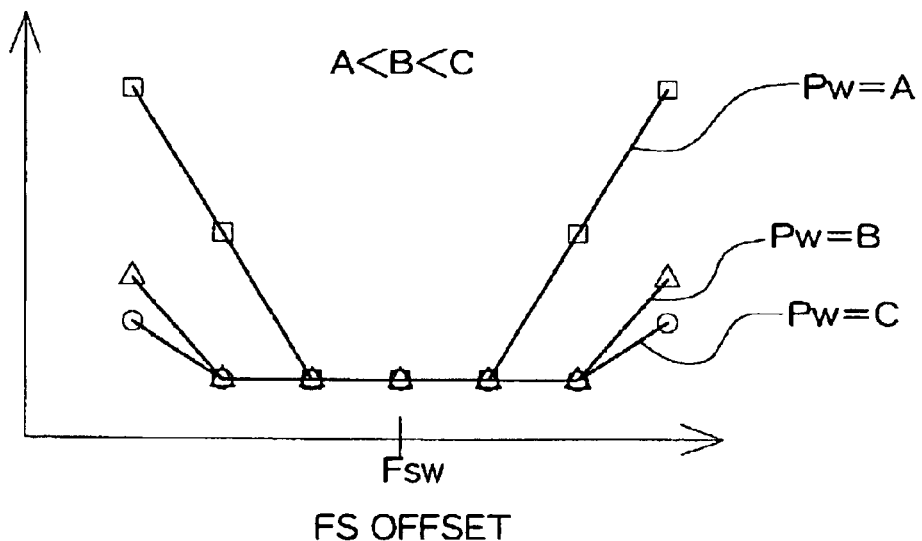
FIG. 4 is a graph showing a relationship between focus offset and error rates.

The reproduction signal quality, that is jitter and an error rate are shown in FIGS. 3 and 4, respectively, when recording conditions are made to deteriorate by changing focus offset of optical pickup, in other words, by shifting a focus position from the optimum position instead of changing the tilt angle. In still other words, changes in jitter and error rate between when test data is recorded on condition that the focus offset is shifted and when the test data is reproduced after recording on condition that the focus offset is returned back to the original state are shown in the figure. In both of the figures, the focus offset of the optical pickup is plotted along abscissa and designated as being at the normal condition when the focus offset is set at an optimum offset Fsw. Under the recording power A, both the amount of jitter and error rate sharply increase when the focus offset is shifted from the optimum point in either positive or negative direction. On the other hand, under the recording power B or C, the amount of change in both jitter and error rate are relatively small when the focus offset is shifted. For a case where the focus offset is shifted, it also can be seen from the figures that the recording powers B and C are capable of providing superior recording margin for the recording power A, and that recording power B is capable of providing a volume of recording margin almost equal to that associated with the recording power C.

Adverse recording conditions can be intentionally created by changing the tilt angle from 0 or by changing the focus offset from the optimum point (shifting a focus position from the optimum position). By recording test data under imperfect recording conditions and evaluating the reproduction signal quality in the test data recorded under such conditions, it becomes possible to estimate the size of the recording margin. Based on the results of this estimation, a value for the optimum recording power which is obtained which is not excessively increased to secure adequate recording margin, yet under which the adequate recording margin is obtained.

Figure 5:
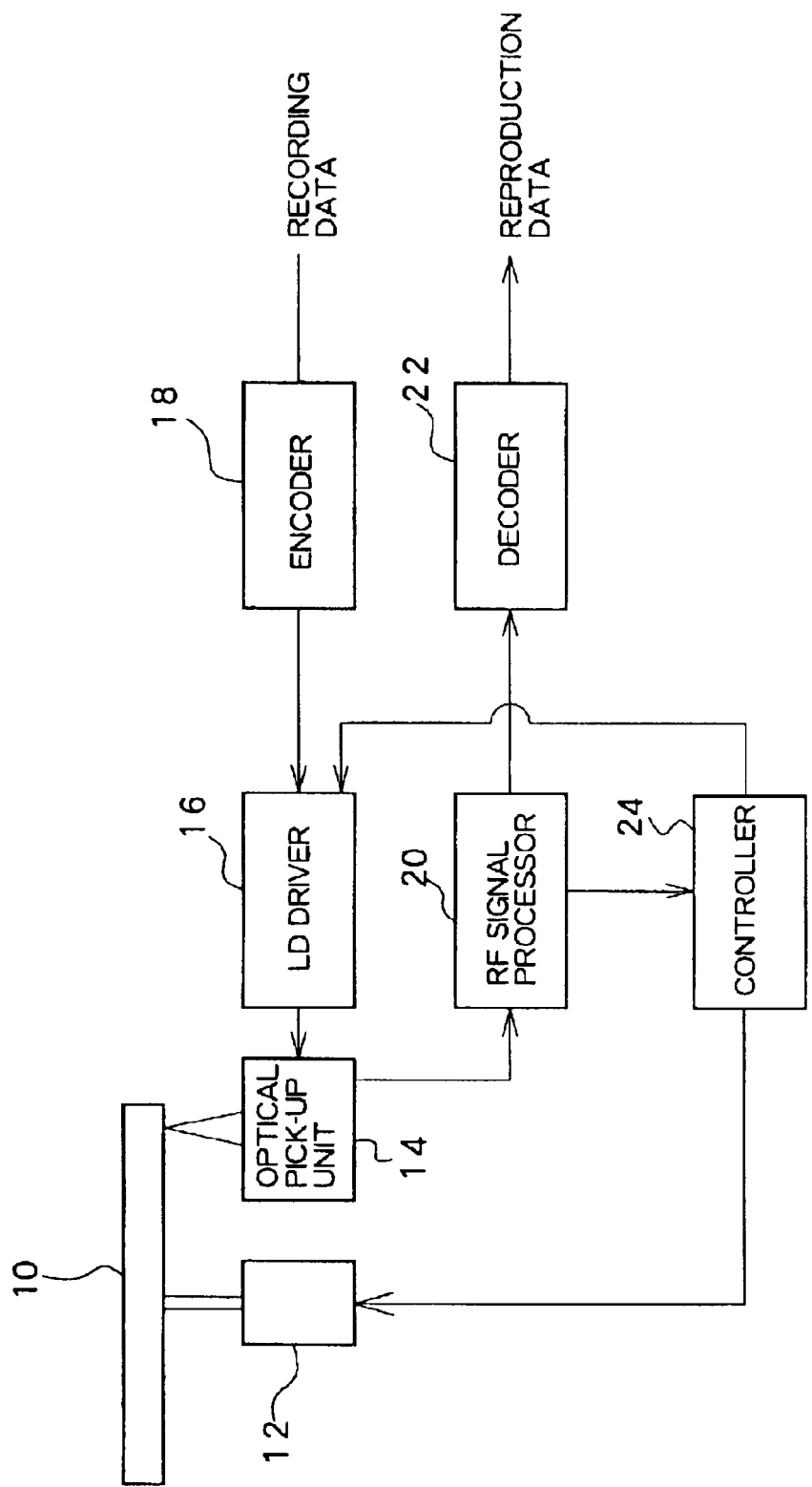
FIG. 5 is a block diagram showing a configuration of an optical disc apparatus.

FIG. 5 shows a block diagram depicting a main configuration of an optical disc apparatus according to the present embodiment. An optical disc 10 is subjected to CAV or CLV control executed by a spindle motor 12.

An optical pickup unit 14 placed to be opposed to the optical disc 10 irradiates laser light of recording power from a laser diode so as to record data on the optical disc 10. In order to record data, a recording film of the optical disc 10 may be partly fused and sublimated to form a pit, or a crystalline state of the optical disc 10 may be heated and cooled to transit to an amorphous state.

In a process of data recording, recording data is supplied to an encoder 18 and then encoded therein. The encoded data is passed to an LD driver 16 which generates a driving signal according to the encoded data and sends the driving signal to the optical pickup unit 14. The control signal from the controller 24 is provided to the LD driver 16. A value for the drive current, that is, a recording power, is determined according to the control signal.

In a process of data reproduction, the LD driver 16 of the optical pickup unit 14 irradiates laser light with reproducing power (reproducing power<recording power), then receives the reflected laser light, and then converts the reflected laser light into an electric signal to obtain a reproduction RF signal. The reproduction RF signal is provided to an RF signal processor 20.

The RF signal processor 20, which comprising an amplifier, an equalizer, a binarizer, a PLL section, binarizes the reproduction RF signal and generates a synchronous clock signal to provide these signals to a decoder 22. The decoder 22 decodes data according to the provided signals and then outputs the signals as reproduction data.

The reproduction RF signal received from the RF signal processor 22 is also provided to the controller 24 for evaluating signal quality. When recorded data is reproduced, a circuit to control a focus servo or a tracking servo by generating a tracking error signal or focus error signal, and a circuit to regenerate a wobble signal formed on the optical disc 10 in order to use the signal for address demodulation or for controlling of the number of revolutions are used in conjunction with the above-noted components. These circuits are equivalent to those in conventional technology, and are therefore not described in detail herein.

In order to determine the optimum recording power, the controller 24 estimates the signal quality of all recorded test data and activates the LD driver 16 to execute OPC. The data used for determining the optimum recording power is not merely recorded on the optical disc 10 while changing recording power in a plurality of, 15 for example, levels so as to calculate the amounts of jitter and error rates from the reproduction RF signal of the recorded test data and then select a recording power under which the amount of jitter and the error rate become smallest. Instead, a control signal is provided to the spindle motor 12 or the optical pickup unit 14 to create adverse recording conditions and test data is test recorded under the adverse recording conditions. Such conditions are created by, for example, tilting the optical disc 10 relative to the optical pickup unit 14. Tilt of the optical disc 10 may be introduced by inclining either or both of the spindle motor 12 or the optical pickup unit 14.

Figure 6:
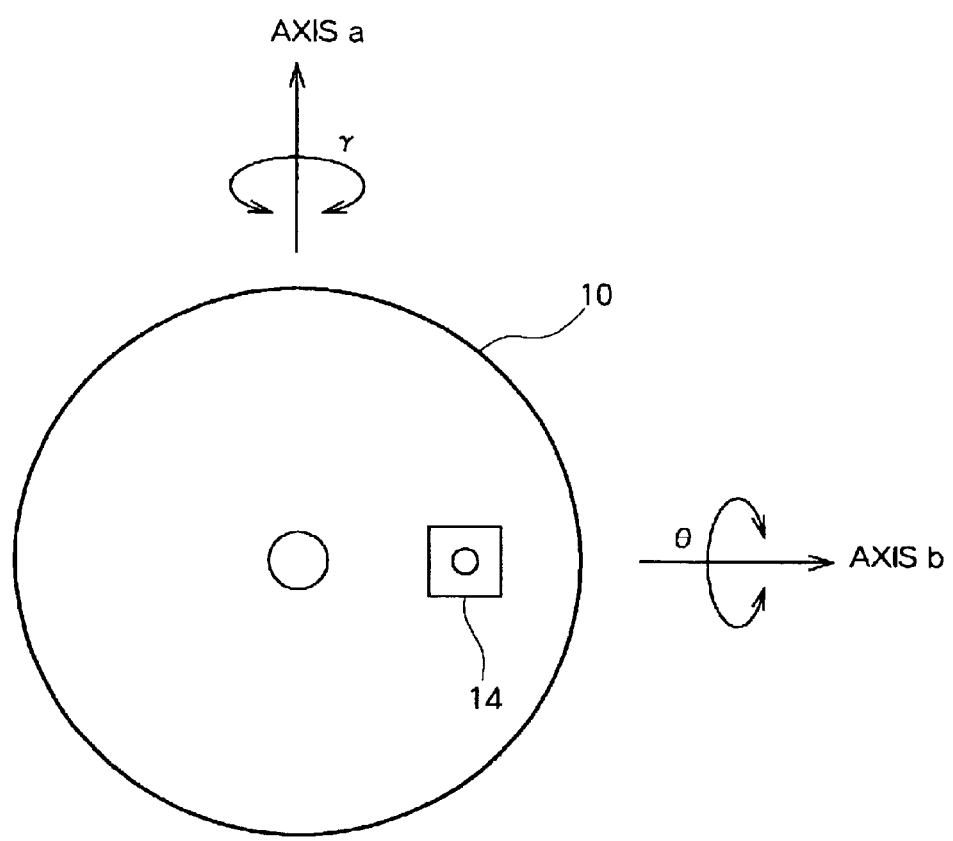
FIG. 6 is a drawing to explain tilt of an optical disc.
Figure 7:
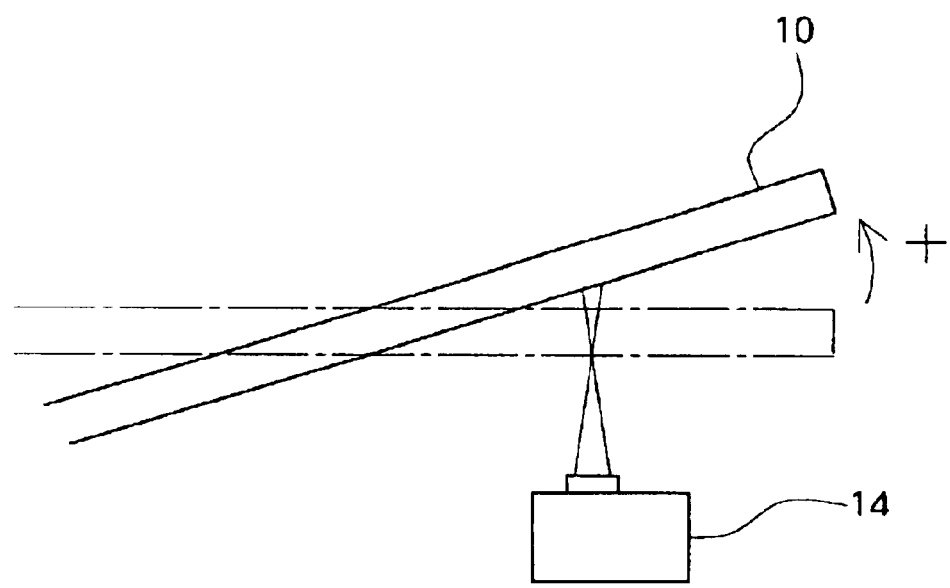
FIG. 7 is a drawing to explain positive tilt in a radius direction.
Figure 8:
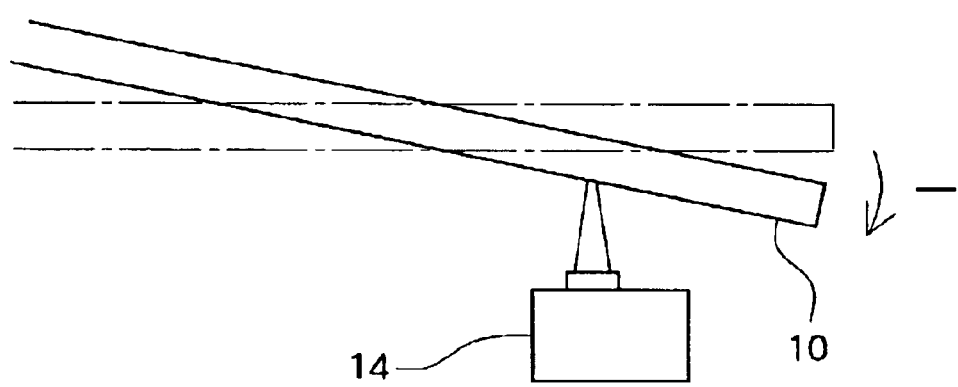
FIG. 8 is a drawing to explain negative tilt in a radius direction.

FIG. 6 shows how the controller 24 tilts the optical disc 10. Referring to tilting directions, the tilt may be introduced in either a radius direction (r direction) of the optical disc 10 or in a perimeter direction (θ direction or tracking direction) of the optical disc 10 may be considered. In order to tilt the disc in the radial direction, the optical disc 10 is rotated about axis (a) shown in FIG. 6 by a very small angle γ. On the other hand, in order to introduce the tilt in the perimeter direction, the optical disc 10 is rotated about axis (b) by a very small angle θ. Positive and negative directions of tilt angle may be arbitrarily determined according to the rotating direction. FIGS. 7 and 8 shows a state in which the tilt is introduced in the radial direction. In FIG. 7, the optical disc 10 is tilted in a direction away from the optical pickup unit 14, which is designated as a positive direction in the present embodiment. On the other hand, in FIG. 8, the optical disc 10 is tilted in a direction toward to the optical pickup unit 14, which is designated as a negative direction in the present embodiment.

Figure 9:
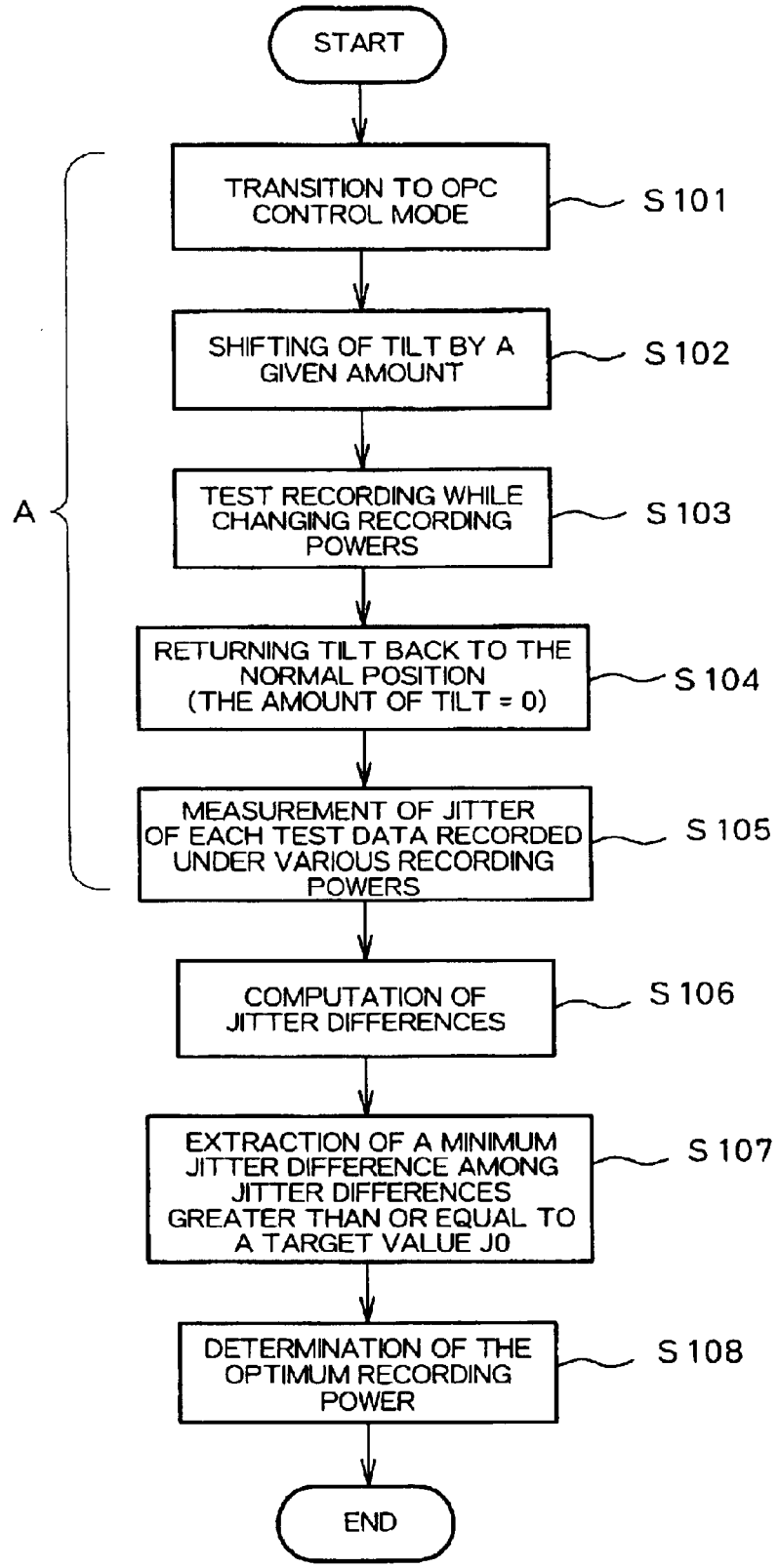
FIG. 9 is a flowchart showing a process performed in a controller.

FIG. 9 shows a flowchart of a process performed in the controller 24 when OPC is executed by tilting the optical disc 10 in the radial direction. First, the controller 24 is transited to an OPC control mode (S101). Then, the controller 24 activates the spindle motor 12 or the optical pickup unit 14 in order to introduce a given amount of tilt angle at the time of recording the test data (S102: tilt angle shifting by a given degree). This tilt setting contributes to deterioration in recording conditions.

Next, the controller 24 records test data while successively changing recording power in a plurality of levels, for example 15 levels (S103).

After the test data is recorded at a plurality of levels of recording power, controller 24 reactivates the spindle motor 12 or the optical pickup unit 14 in order to return the tilt angle back to the normal state, in other words, to a state of tilt angle=0 (not tilted state) (S104). In the normal state, the test data recorded under each of the different recording powers is reproduced to input a reproduction RF signal. The amount of jitter in the reproduction RF signal is measured according to the input (S105). The amount of jitter may be obtained by measuring, for example, the amount of jitter in a 3T signal, but not limited to the 3T signal. It is also preferable to measure the amount of jitter of other frequencies. As a result of this process, sets of data regarding the amount of jitter are obtained in a number equal to that of the number of recording powers.

After completing measurement of the amount of jitter, the controller 24 computes the amount of change in jitter between neighboring recording powers, in other words, jitter differences (S106). For example, when the following pairs of (recording power, the amount of jitter) are taken: (10 mw, 20%), (11 mw, 15%), (12 mw, 12%), (13 mw, 11%), (14 mw, 10%) and (15 mw, 9%), the below-listed jitter difference values are obtained.

The jitter difference between 10 mw and 11 mw is:

$$J(10 \text{ mw})-J(11 \text{ mw})=5\%.$$

The jitter difference between 11 mw and 12 mw is:

$$J(11 \text{ mw})-J(12 \text{ mw})=3\%.$$

The jitter difference between 12 mw and 13 mw is:

$$J(12 \text{ mw})-J(13 \text{ mw})=1\%.$$

The jitter difference between 13 mw and 14 mw is:

$$J(13 \text{ mw})-J(14 \text{ mw})=1\%.$$

The jitter difference between 14 mw and 15 mw is:

$$J(14 \text{ mw})-J(15 \text{ mw})=1\%.$$

After calculating each of the amounts of change in jitter (jitter differences) between the neighboring recording powers, all jitter differences grater than or equal to a target value J0 prestored in a memory of the controller 24 are extracted and from among these the smallest jitter difference is selected (S107). When the target value J0 is, for example, 2%, the following two jitter differences are obtained as the jitter differences greater than or equal to the target value among the above listed five jitter differences:

$$J(10 \text{ mw})-J(11 \text{ mw})=5\% \text{ and}$$

$$J(11 \text{ mw})-J(12 \text{ mw})=3\%.$$

The smallest jitter difference between the above two jitter differences is $$J(11\ mw) - J(12\ mw) = 3\%.$$

Once the jitter difference satisfying the condition is selected, the controller 24 determines the optimum recording power based on the selected jitter difference (S108). More specifically, the recording powers associated with the selected jitter difference are 11 mw and 12 mw. Either one of these recording powers, for example, the higher recording power of 12 mw, is determined as the optimum recording power with enough recording margin.

Figure 10:
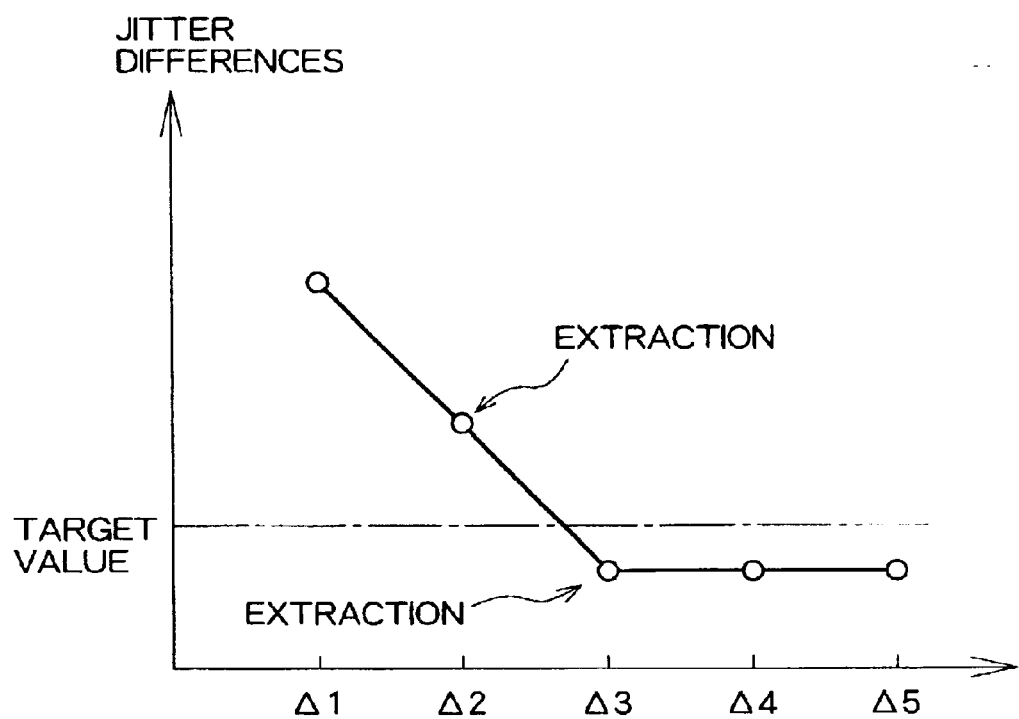
FIG. 10 is a graphical representation showing the amount of change in jitters between neighboring two recording powers.

Referring to FIG. 10 schematically showing the above-described process, jitter difference values for $\Delta 1 = J(10\ mw) - J(11\ mw)$, $\Delta 2 = J(11\ mw) - J(12\ mw)$, ... are plotted along the abscissa and the amounts of change in jitter (jitter differences) are plotted along the ordinate. The jitter differences greater than or equal to the target value J0 among the jitter differences associated with each of the recording powers are the jitter differences corresponding to $\Delta 1$ and $\Delta 2$. The smallest jitter difference of $\Delta 2$, in other words, the jitter difference closest to the target value is selected so that the optimum recording power is determined from the recording power associated with $\Delta 2$. Because the jitter differences at $\Delta 1$ and $\Delta 2$ are large, as is evident from FIG. 10, it can be understood that at $\Delta 1$ and $\Delta 2$, the reproduction RF signal quality substantially deteriorates with variations in recording power. At $\Delta 3$, $\Delta 4$, and $\Delta 5$, on the other hand, because the jitter differences thereof do not vary largely regardless of a change in recording power, that deterioration in the reproduction signal quality is small. From the figure, it can be concluded that the recording powers corresponding to $\Delta 3$, $\Delta 4$, and $\Delta 5$ are adequate for each providing enough recording margin, and $\Delta 1$ and $\Delta 2$ locates on a border between the recording power adequate for providing the enough recording margin and the recording power inadequate for providing the enough recording margin. Accordingly, by selecting the higher recording power associated with $\Delta 2$, the lowest recording power among the recording powers capable of providing the largest recording margin can be determined as the optimum recording power.

In the above-described embodiment, it is also possible to determine the optimum recording power by selecting the jitter difference closest to the target value among jitter differences smaller than or equal to the target value depending on a setting of the target value. For the example of FIG. 10, either one of the recording powers 12 mw and 13 mw associated with $\Delta 3$, for example, the smaller recording power 12 mw may be determined as the optimum recording power.

The target value previously retained in a control data zone of the optical disc may be retrieved and then stored in the memory of the optical disc. It is, of course, possible to prestore the target value in the memory during the drive (optical disc apparatus) manufacturing process.

In the above example, an optimum recording power capable of providing the enough recording margin, that is, capable of executing stable recording regardless of deterioration in recording conditions is determined based on the amounts of change in jitter between neighboring recording powers. It is also possible to evaluate the amounts of change in jitter according to another method.

For example, the size of recording margin may be evaluated using differences in jitter subtracted from a given reference instead of using the amounts of change in jitter between neighboring recording powers.

Figure 11:
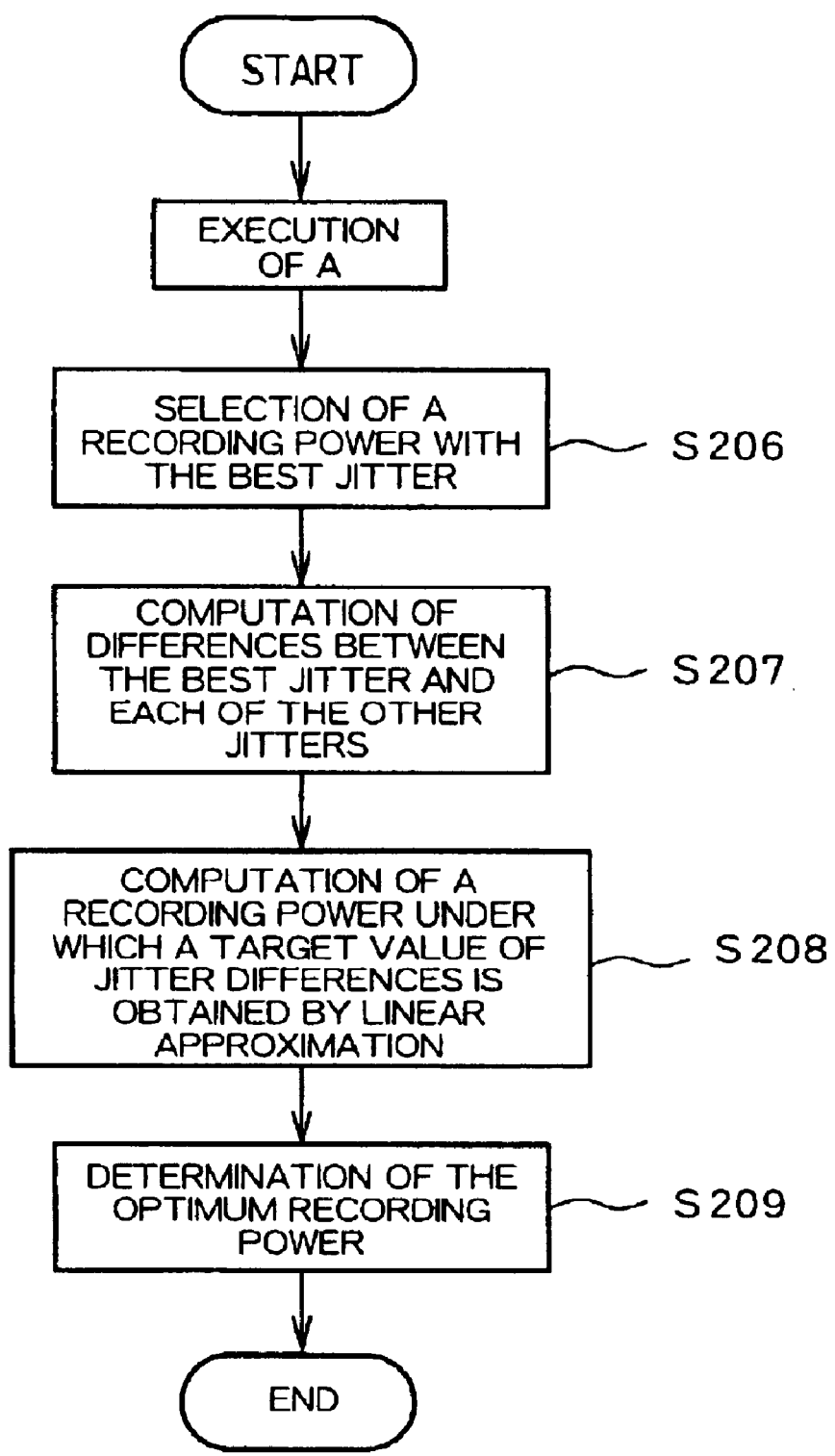
FIG. 11 is a flowchart showing another process performed in the controller.

FIG. 11 shows a flowchart of another process performed in the controller 24. Process steps from S101 to S105 indicated in FIG. 9 (referred to as process A) are identical with the above-described process. After the completion of process A, the best recording power (i.e. a recording power associated with the smallest amount of jitter) is selected from the obtained amounts of jitter (S206). In the above example, when a recording power Pw is 15 mw, jitter J assumes a minimum value of 9%. Therefore, the recording power Pw=15 mw is selected. It is also preferable to select the smallest amount of jitter instead of recording power. After selection, differences in the amounts of jitter between the best jitter and the other jitters are calculated (S207). More specifically, the differences are as follows:

$$J(10\ mw) - J(15\ mw) = 11\%$$

$$J(11\ mw) - J(15\ mw) = 6\%$$

$$J(12\ mw) - J(15\ mw) = 3\%$$

$$J(13\ mw) - J(15\ mw) = 2\%$$

$$J(14\ mw) - J(15\ mw) = 1\%$$

$$J(15\ mw) - J(15\ mw) = 0\%$$

After calculating the differences in the amounts of jitter by subtraction of the reference amount of jitter, recording powers under which the target value J0 (a target value for the amount of change from the best jitter (the reference amount of jitter)) prestored in the memory of the controller 24 is achieved are computed by linear approximation or the like (S208). When J0=4% is taken in the above case, values close to this target value are as follows:

$$J(11\ mw) - J(15\ mw) = 6\%$$

$$J(12\ mw) - J(15\ mw) = 3\%$$

By linearly approximating these values, 11.66 mw is obtained as a recording power under which a value of 4% is achieved. The value of 11.66 mw obtained by linear approximation is determined as the optimum recording power capable of providing enough recording margin (S209).

According to this method, it is also possible to determine the optimum recording power capable of providing sufficient recording margin.

Alternatively, the size of recording margin may be evaluated using error rates of reproduction signals instead of the amount of jitter as the reproduction signal quality as shown in FIG. 2. The error rates may be calculated from the number of correction bits used for correcting the data decoded by the decoder 22 in an error correction circuit (not illustrated).

Figure 12:
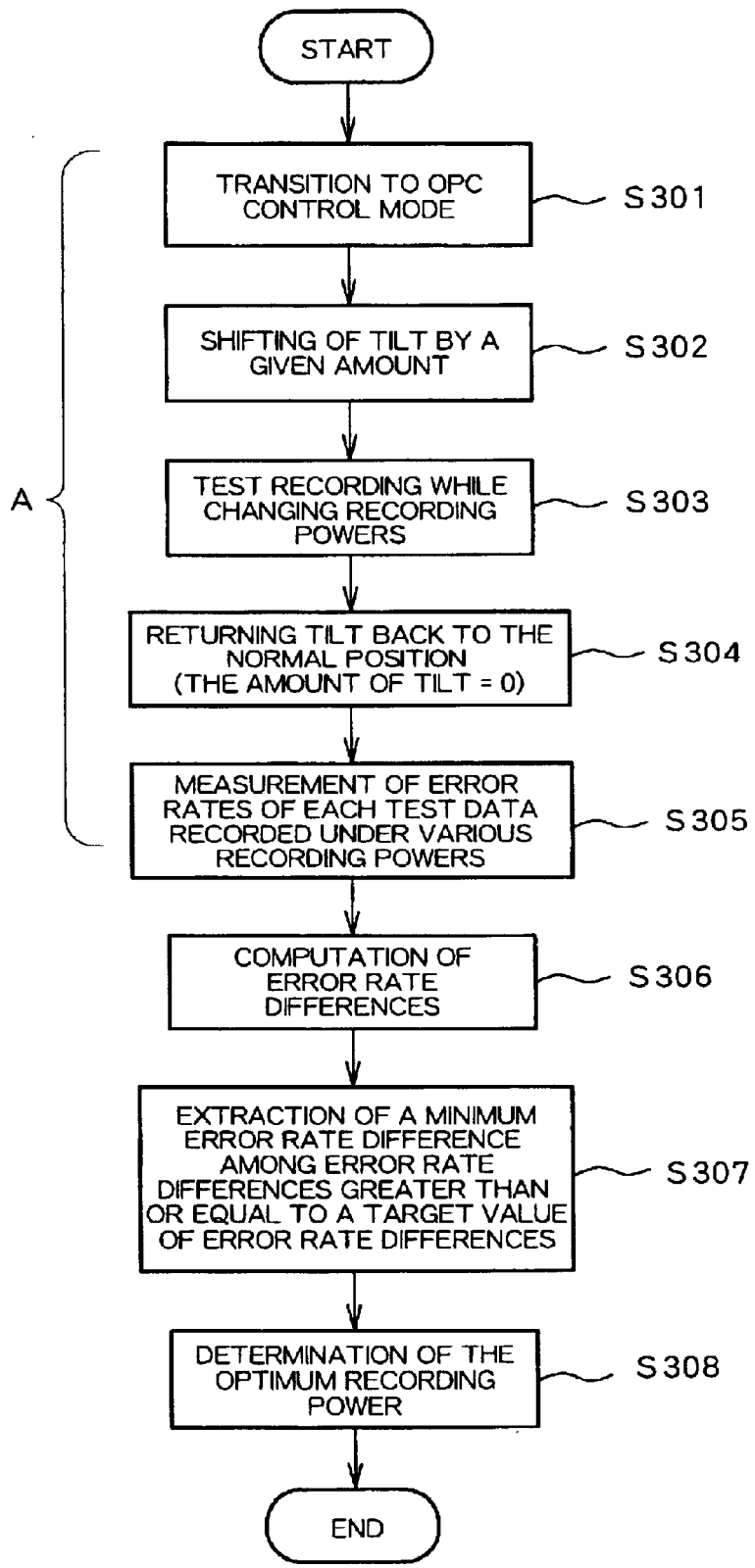
FIG. 12 is a flowchart showing still another process performed in the controller.

FIG. 12 shows a flowchart of still another process performed in the controller 24. In contrast to the example shown in FIG. 9, error rates are used as a substitute for the amounts of jitter. More specifically, process steps from S301 to S304 are identical to the steps from S101 to S104 shown in FIG. 9. Error rates of reproduction signals are calculated at step S305 and each amount of change in error rate (error rate differences) between neighboring recording powers is computed at step S306. Further, two recording powers under which the smallest error rate difference among the error rate differences greater than or equal to a target error rate difference is obtained are extracted at step S307 and then at step S308 the larger recording power among the two recording powers is selected as the optimum recording power.

Figure 13:
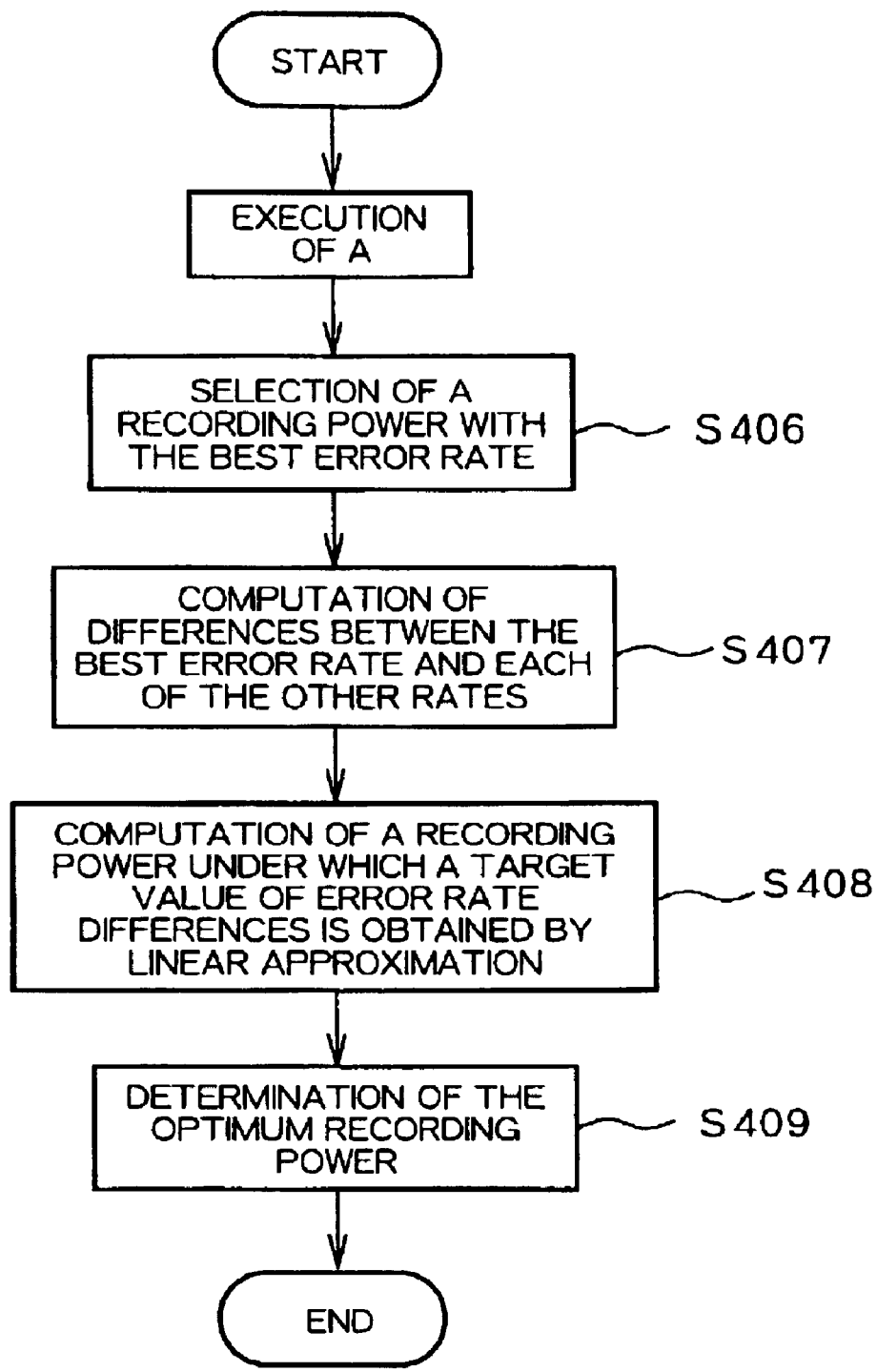
FIG. 13 is a flowchart showing a further process performed in the controller.

Also in this method, the size of the recording margin may be evaluated by calculating differences in error rate between an error rate and a reference error rate. A flowchart of the controller 24 regarding this case is shown in FIG. 13 for reference. First, process steps identical to process A shown in FIG. 12 are executed. Next, a minimum error rate is selected (S406). Next, differences between the minimum error rate and each of the other error rates, in other words, the amount of change in error rate is calculated (S407) and then a recording power under which the target value of error rate differences is obtained is calculated by linear approximation (S408) so as to determine the calculated recording power as the optimum recording power (S409).

Although the optical disc 10 is tilted against the optical pick-up 14 so as to create adverse recording conditions under OPC in the above-described embodiment, it is possible to shift the focus (FS) offset of the optical pick-up 14 from the best point to another point, that is, the optical pick-up 14 is defocused so as to intentionally deteriorate the recording conditions.

Figure 14:
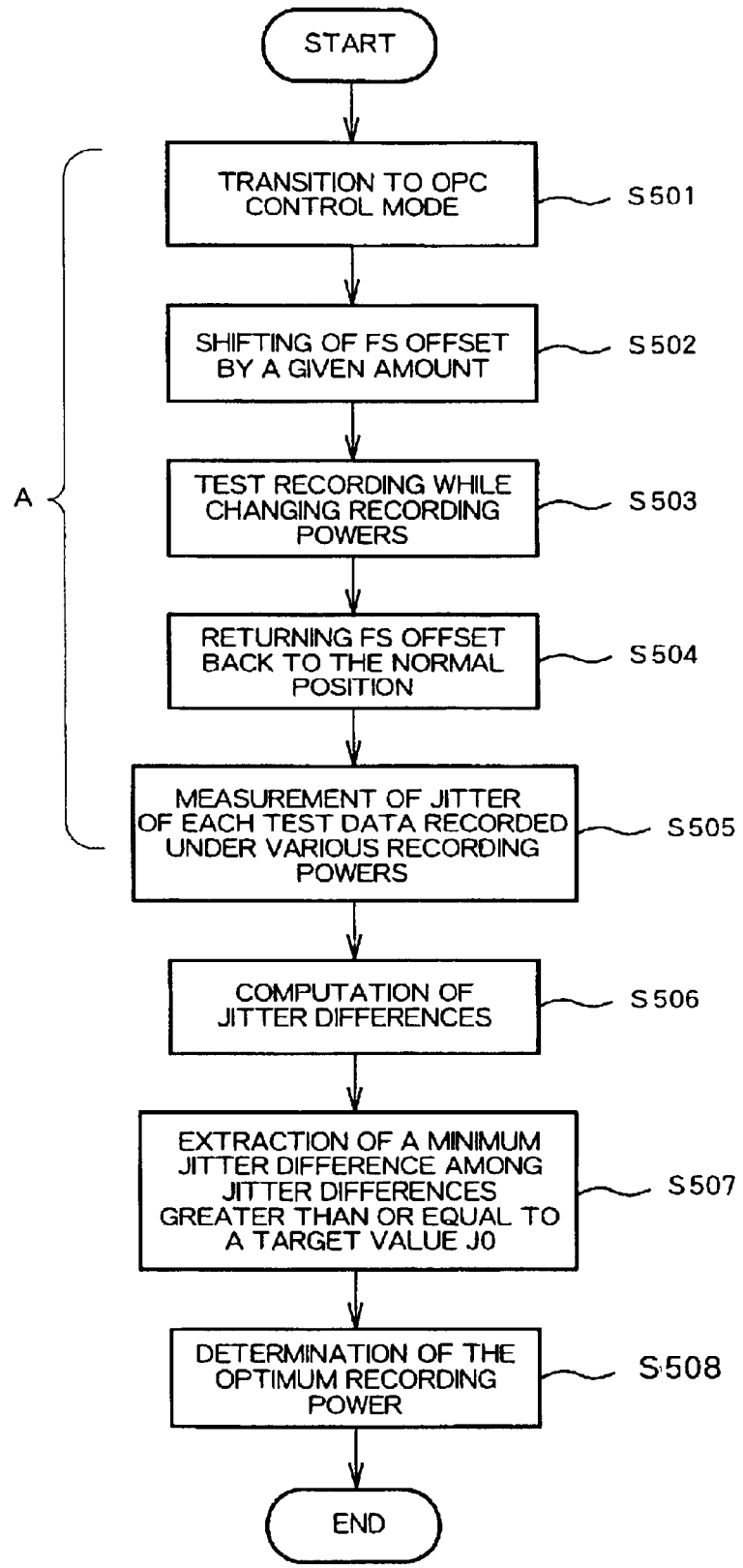
FIG. 14 is a flowchart showing a further process performed in the controller.

FIG. 14 shows a flowchart of a process performed in the controller 24 in such a case. In contrast to the process shown in FIG. 9, test data is recorded under a state that the FS offset is shifted from the best point Fsw by a given amount (S502) based on a control signal provided from the controller 24 to the optical pick-up unit 14.

This method also makes it possible to determine the optimum recording power capable of providing sufficient recording margin under OPC.

Up to this point, determination of the optimum recording power has been described. When the optical disc 10 is rewritable, it is also possible to erase data using a laser light of an erasing power (reproducing power<erasing power<recording power) irradiated from the optical pick-up unit 14. In such a case, optimization of the erasing power may be desired.

For example, after determination of the optimum recording power according to either one of the methods described above, the optimum erasing power can be determined by multiplying the determined optimum recording power Pwo by an established coefficient $\epsilon$ ($\epsilon<1$).

It is also possible to determine the optimum erasing power directly according to either one of the above-described methods. In FIG. 9, for example, the optical disc 10 is tilted to overwrite test data while changing erasing powers. At this time, the amount of jitter in the overwritten data is measured. When the margin of the erasing power is insufficient, the stored data is not completely deleted during overwriting, and, as a result, the amount of jitter increases sharply. Therefore, by evaluating the margin of erasing power based on the amount of change in jitter, it becomes possible to determine a value for the optimum erasing power with a larger margin.

Although the present invention has been described as related to the illustrative embodiment, it is understood that various changes and modifications may be made in the invention without departing from the spirit and scope thereof. For example, when data is recorded on both a land and a groove on the optical disc 10, it is possible to determine the respective optimum recording powers (and the optimum erasing powers) for both land recording and groove recording by specifying the separate target values.

Further, although examples of tilt and FS offset changed to deteriorate recording conditions in the preferred embodiment were described, all conditions which deteriorate recording conditions when they are changed are intended to be embraced by the present invention. Such conditions include, for example, rotation speed. For example, it is possible to evaluate the recording margin by executing test recording with increased rotation speed faster than normal speed.

Although in the examples of the embodiment, either tilt or FS offset is changed to deteriorate recording conditions, both tilt and FS offset may be changed to obtain deteriorated recording conditions.

In addition, it is possible to determine the optimum recording power by changing tilt and FS offset as a target for the deteriorated recording conditions, using values for jitter and error rate as the reproduction signal quality, selecting candidates for the optimum recording power based on results of executing all combinations, and then specifying the smallest (or largest) power among the candidates as the optimum recording power. It is obvious that combinations other than those described in the embodiment may be employed. For example, the optimum recording power may be determined by using both jitter and error rate values as indicators for the reproduction signal quality in addition to tilting the optical disc 10 in a circumferential direction. The amount of tilt or offset may be changed in a plurality of steps to perform the same procedure as described above.

What is claimed is:

1. An optical disc apparatus comprising:
    recording means for recording test data on a predetermined area of an optical disc by irradiating laser light while changing recording power in a plurality of levels,
    reproducing means for reproducing said test data, and
    setting means for determining an optimum recording power by evaluating signal quality of a reproduction signal, wherein
    said recording means deteriorate recording conditions and then records said test data under deteriorated recording conditions,
    said reproducing means recovers said recording conditions from the deteriorated state and then reproduces said test data, and
    said setting means determines said optimum recording power based on an amount of change in said signal quality from each recording power to another recording power.

2. The optical disc apparatus according to claim 1, wherein said recording conditions are deteriorated by tilting said optical disc relative to said laser light.

3. The optical disc apparatus according to claim 1, wherein said recording conditions are deteriorated by tilting said optical disc against relative to laser light in either radius or circumference direction.

4. The optical disc apparatus according to claim 1, wherein said recording conditions are deteriorated by shifting a focus position of said laser light.

5. The optical disc apparatus according to claim 1, wherein said recording conditions are deteriorated by shifting a focus offset value which specifies a focus position of said laser light.

6. The optical disc apparatus according to claim 1, wherein said recording conditions are deteriorated by increasing rotation speed of said optical disc.

7. The optical disc apparatus according to claim 1, wherein jitter is used to indicate signal quality of said reproduction signal.

8. The optical disc apparatus according to claim 1, wherein error rate is used to indicate signal quality of said reproduction signal.

9. The optical disc apparatus according to claim 7, wherein said setting means determines said optimum recording power by comparing the amount of change in jitter from each recording power to another recording power with a reference value.

10. The optical disc apparatus according to claim 7, wherein said setting means compares each amount of change in jitter between two neighboring recording powers with a reference value so as to set the optimum recording power at either one of two recording powers under which the minimum amount of change in jitter among the amounts of change in jitter greater than or equal to said reference value is obtained.

11. The optical disc apparatus according to claim 7, wherein said setting means compares each amount of change in jitter between two neighboring recording powers with a reference value so as to set the optimum recording power at either one of two recording powers under which the maximum amount of change in jitter among the amounts of change in jitter smaller than or equal to said reference value is obtained.

12. The optical disc apparatus according to claim 7, wherein said setting means compares the amount of change in jitter between a recording power to which attention is given and a reference recording power with a reference value so as to set the optimum recording power at a recording power under which said amount of change in jitter matches the reference value.

13. The optical disc apparatus according to claim 8, wherein said setting means compares the amount of change in error rate between each recording power and another recording power with a reference value so as to determine said optimum recording power.

14. The optical disc apparatus according to claim 8, wherein said setting means compares the amount of change in error rate between each pair of neighboring recording powers with a reference value so as to set said optimum recording power at either one of two recording powers under which the minimum amount of change in error rate among the amounts of change in error rate greater than or equal to said reference value is obtained.

15. The optical disc apparatus according to claim 8, wherein said setting means compares the amount of change in error rate between each pair of neighboring recording powers with a reference value so as to set said optimum recording power at either one of two recording powers under which the maximum amount of change in error rate among the amounts of change in error rate smaller than or equal to said reference value is obtained.

16. The optical disc apparatus according to claim 8, wherein said setting means compares the amount of change in error rate between a recording power to which attention is given and a reference recording power with a reference value so as to set said optimum recording power at a recording power under which the amount of change in error rate matches the reference value.

17. The optical disc apparatus according to claim 1, further comprising overwrite means for overwriting said test data while changing erasing power in a plurality of levels, wherein said overwrite means deteriorates recording conditions and then executes overwrite under the deteriorated recording conditions, and said setting means determines an optimum erasing power based on each amount of change in said signal quality from a erasing power to another erasing power.

18. The optical disc apparatus comprising:

an optical pick-up unit for recording test data on a predetermined area of an optical disc while changing recording power of laser light in a plurality of levels and reproducing said test data, a drive circuit for tilting said optical disc by a given angle at the time of recording said test data and recovering said optical disc from tilting at the time of reproducing said test data, a signal processing circuit for detecting signal quality of a reproduction signal provided from said optical pick-up unit and a control circuit for computing the amount of change in signal quality from each recording power to another recording power and selecting a recording power under which the amount of change becomes smaller than or equal to a threshold value to set the selected recording power as a recording power of said optical pick-up unit.

19. An optical disc apparatus comprising:

an optical pick-up unit for recording test data on a predetermined area of an optical disc while changing recording power of laser light in a plurality of levels and reproducing said test data, a drive circuit for defocusing said laser light at the time of recording said test data and recovering said laser light into focus at the time of reproducing said test data, a signal processing circuit for detecting signal quality of a reproduction signal provided from said optical pick-up unit and a control circuit for computing the amount of change in signal quality from each recording power to another recording power and selecting a recording power under which the amount of change becomes smaller than or equal to a threshold value to set the selected recording power as a recording power of said optical pick-up unit.

* * * * *

UNITED STATES PATENT AND TRADEMARK OFFICE
CERTIFICATE OF CORRECTION

PATENT NO. : 6,898,163 B2
DATED : May 24, 2005
INVENTOR(S) : N. Takeda

It is certified that error appears in the above-identified patent and that said Letters Patent is hereby corrected as shown below:

Title page,
Item [73], Assignee, "Musashino" should read -- Tokyo --.

Column 10,
Line 29, "deteriorate" should read -- deteriorates --.
Line 45, "disc against relative" should read -- disc relative --.
Line 45, "either radius" should read -- either a radius --.

Column 12,
Line 4, "wherein" should read -- wherein: --.
Line 12, "The optical" should read -- An optical --.
Line 24, "unit and" should read -- unit, and --.
Line 43, "unit and" should read -- unit, and --.

Signed and Sealed this

Sixth Day of December, 2005

JON W. DUDAS
*Director of the United States Patent and Trademark Office*